United States Patent Office 3,281,418

Patented Oct. 25, 1966

3,281,418

ACCELERATOR OF VULCANIZATION OF RUBBER

William Budd, Cuyahoga Falls, and Wellington B. Adams, Akron, Ohio, assignors to The Goodyear Tire & Rubber Company, Akron, Ohio, a corporation of Ohio No Drawing. Filed July 12, 1963, Ser. No. 294,737
5 Claims. (Cl. 260—247.1)

This invention relates to 2-(4-morpholinyldithio) benzothiazole, and more particularly an improved method of making this effective rubber accelerator.

The class of compounds exemplified by 2-(4-morpholinyldithio) benzothiazole are powerful accelerators of vulcanization of rubber. They can be used to promote the curing of rubber with or without sulfur. These materials are particularly useful in black tread stocks and other compositions containing rubber in which a powerful, yet delayed action, non-scorching accelerator is needed to promote the curing of the rubber composition.

U.S. Patent No. 2,837,510, of June 3, 1958, discloses a method of preparing amino azole disulfides by reacting an azyldisulfide, a secondary amine, sulfur and an oxidizing agent in an inert organic solvent. This reference teaches that in order to prepare an amino azole disulfide from the above reactants the oxidizing agent must be added slowly and that the reaction mixture is to be stirred for a substantial period of time in the neighborhood of 30 minutes or more. The patent also teaches that with the slow addition of oxidizing agent crystals began to form in the reaction mixture before all of the oxidizing agent was added to the reaction mixture, this necessitated the use of additional solvent to permit adequate stirring of the reaction mixture. The yield obtained by the patentee following the above outlined procedure was approximately 79 percent of theoretical.

It is therefore an object of the present invention to provide an improved method for producing 2-(4-morpholinyldithio) benzothiazole. It is a further object of this invention to provide a process for producing 2-(4-morpholinyldithio) benzothiazole which will produce a high yield of a high purity product. Further objects of this invention will be apparent from the following description.

According to the present invention an improved method has been developed for producing 2-(4-morpholinyldithio) benzothiazole by preparing in an inert organic solvent a solution of morpholine, sulfur and a compound selected from the group consisting of 2,2′-bis(benzothiazyl) disulfide and 2-mercaptobenzothiazole and then rapidly adding to said solution while it is being continuously agitated at least a chemical equivalent of a solution of a water soluble oxidizing agent prior to the crystallization of any of the 2-(4-morpholinyldithio) benzoiazole product from the solution. This improved process produces a surprisingly high yield of product having a very high purity and thus represents a substantial and unexpected advance in the art of producing this class of accelerators.

The advantages of the presently disclosed process for producing 2-(4-morpholinyldithio) benzothiazole over the processes disclosed in the prior art are that the reaction between the reactants is complete while all the materials are in a liquid phase and before the 2-(4-morpholinyldithio) benzothiazole starts to crystallize out of the reaction solution. This makes it possible to achieve complete and uniform reaction of all of the reactants in the shortest possible time and thus avoids a serious mixing problem, localized over-oxidation of some of the reactants and the need for additional solvent to be added to the reaction system to maintain a reaction mass of stirrable consistency. The present rapid oxidation process requires that all of the oxidizing agent be added to the reaction mixture very rapidly, within 15 seconds to 2½ minutes prior to the crystallization of any of the 2-(4-morpholinyldithio) benzothiazole, and the reaction is completed in a maximum of 10 minutes with the reaction between most of the combination of reactants employed in the present process being completed in 5 minutes or less, in contrast to the prior art procedures which take from 30 to 60 minutes or more.

The oxidizing agents which can be successfully employed in the practice of the disclosed improved process for producing 2-(4-morpholinyldithio) benzothiazole are those water soluble oxidizing agents that have sufficient solubility in water to produce solutions that are at least 1.2 molar concentration. Preferred oxidizing agents are those which have sufficient water solubility to produce aqueous solutions of 1.9 to 2.2 molar concentration. As used throughout the specification and the accompanying claims the term "water soluble oxidizing agent" shall mean an oxidizing agent having sufficient water solubility at room temperature to produce a solution that is at least 1.2 molar. Specific examples of suitable oxidizing agents are sodium hypochlorite, hydrogen peroxide, ammonium persulfate, potassium permanganate and calcium hypochlorite. Among these oxidizing agents sodium hypochlorite, hydrogen peroxide and calcium hypochlorite are preferred. The oxidizing agents are employed in at least a chemically equivalent amount in order to completely oxidize the 2,2′-bis(benzothiazyl) disulfide or 2-mercaptobenzothiazole employed as a reactant. The most satisfactory results are obtained when a molar excess of approximately 20 percent of the oxidizing agent is employed based on the mols of 2,2′bis(benzothiazyl) disulfide or 2-mercaptobenzothiazole employed.

The inert organic solvents which are to be used in the disclosed process are the customary inert organic solvents such as the lower aliphatic alcohols having from three to five carbon atoms and the aromatic solvents such as benzene, toluene and xylene. Preferred solvents are isopropanol, normal propanol, isobutanol, normal butanol, tertiary butanol and normal amyl alcohol. The proportion of solvent to be employed will normally be approximately 110 percent by weight based on the weight of 2,2′-bis(benzothiazyl) disulfide or 2-mercaptobenzothiazole employed as initial reactants.

Both the morpholine and sulfur which are used in the disclosed process are preferably employed in at least a slight molar excess. In general, approximately 110 percent of the chemical equivalent of morpholine and sulfur will be used based on the mols of 2,2′-bis(benzothiazyl) disulfide or 2-mercaptobenzothiazole present as initial reactants.

The temperature at which the presently disclosed process is to be carried out should be above the crystallization temperature of the initial solution of reactants and in general be at least 5° C. above the crystallization temperature of the initial solution of reactants composed of an inert organic solvent containing morpholine, sulfur and a compound selected from 2,2′ bis(benzothiazyl) disulfide or 2-mercaptobenzothiazole. For most solvent systems it has been found that a temperature of at least 55° C. is required in order to prevent crystallization of some of the initial reactants. The upper temperature limit at which the reaction should be allowed to proceed should not exceed the boiling point of the inert solvent. In general this will require that the upper temperature limit of the reaction should not exceed 128° C. The oxidizing reaction is quite exothermic and it will therefore frequently be necessary to take appropriate steps to prevent the reaction temperature from becoming too high. It has been found that very favorable results may be obtained if the oxidizing agent is added to the solution of morpholine, sulfur and 2,2′ bis(benzothiazyl) disulfide or 2-mercaptobenzothiazole at a temperature of approximately 60° C. and then permit the reaction mixture to rise to a temperature of 75 to 80° C. during the brief reaction period.

The practice of the present invention is illustrated by the following examples but they are not to be interpreted as limitations on the invention.

*Example 1*

A two-liter reactor equipped with agitator and heating mantle was charged with 127.6 grams of morpholine and 250 grams of isopropanol, which were heated to 75° C. Two hundred and twenty-two grams of 2,2′ bis(benzothiazyl) disulfide and 46.9 grams of sulfur were then added to the reaction mixture accompanied by constant stirring, these last two reactants went readily into solution in the isopropanol solvent. The reaction mixture was allowed to cool to 69° C. and 369 milliliters of a 2.18 molar solution of sodium hypochlorite was added to the reaction mixture in 30 seconds. The resulting liquid-liquid mixture was subjected to agitation for an additional period of 3½ to 4 minutes before crystals of 2-(4-morpholinyldithio) benzothiazole began to form. The reaction was complete within 4½ minutes after the addition of the sodium hypochlorite. During the addition of the sodium hypochlorite the temperature of the reaction mixture rose to 78° C. The resulting 2-(4-morpholinyldithio) benzothiazole product was then reslurried in water and washed twice with hot water. The yield of product was 349 grams, representing 92 percent of theoretical yield. The resulting product had a purity of 100 percent as determined by the method described by J. G. Lichty et al. in "Industrial and Engineering Chemistry Product Research Development," volume 2, Number 1, pages 16–21, March 1963.

*Example 2*

A 600 milliliter reactor equipped with agitator and heating mantle was charged with 28.7 grams of morpholine and 96.5 grams of isopropanol which were heated to 75° C., 49.4 grams of 2-mercaptobenzothiazole and 10.5 grams of sulfur were then added to the reaction mixture accompanied by constant stirring. These last two reactants were readily soluble in the isopropanol solvent. The reaction mixture was allowed to cool to approximately 70° C. and 188 grams of a 2.2 molar solution of sodium hypochlorite was added to the reaction mixture in approximately one minute. The resulting liquid-liquid mixture was subjected to agitation for an additional three to four minutes. Crystals of 2-(4-morpholinyldithio) benzothiazole began to form approximately three minutes after the addition of the sodium hypochlorite solution. During the addition of the sodium hypochlorite the temperature of the reaction mixture rose to 78 to 80° C. The resulting 2-(4-morpholinyldithio) benzothiazole product was then reslurried and washed twice with hot water. The yield of product was 75.3 grams, representing 92.4 percent of theoretical yield. The resulting product had a purity of 99 percent as determined by the method referred to in Example 1.

*Example 3*

One hundred twenty-eight and two-tenths grams of morpholine and 244 grams of isopropanol were mixed in a two-liter reactor in accordance with the procedure described in Example 1 above. Two hundred twenty-three and three-tenths grams of 2,2′ bis(benzothiazyl) disulfide and 43.7 grams of sulfur were then added to this reaction mixture which was cooled to approximately 69° C. before the rapid addition (approximately 25 seconds) of 151 grams of a 15 percent aqueous solution of hydrogen peroxide. The resulting liquid-liquid mixture was subjected to vigorous agitation for an additional two and one-half minutes before 2-(4-morpholinyldithio) benzothiazole began to crystallize from the solution. After stirring the mixture for approximately two more minutes, making a total reaction time of slightly less than five minutes, the reaction was complete and the resulting 2-(4-morpholinyldithio) benzothiazole product was washed and reslurried twice with hot water. The yield of product was 318.8 grams, representing 84.1 percent of theoretical yield. The resulting product had a purity of 82.3 percent as determined by the method referred to in Example 1.

*Example 4*

One hundred twenty-eight and two-tenths grams of morpholine and 274 grams of benzene were charged to a two-liter reactor according to the procedure described in Example 1, 223.3 grams of 2,2′ bis(benzothiazyl) disulfide and 43.7 grams of sulfur were then added to the reaction mixture which was subjected to constant stirring. The mixture was then cooled to approximately 69° C. and 458 grams of 2.22 molar solution of sodium hypochlorite was added to the reaction mixture in 55 seconds. The resulting liquid-liquid mixture was subjected to agitation for an additional period of nine minutes, during which period the temperature rose to approximately 77° C. At the end of this mixing period a slight amount of additional water was added to the mixture in order to promote the formation of crystals of 2-(4-morpholinyldithio) benzothiazole which were recovered and washed twice with hot water. The yield of product was 330.4 grams, representing 87.1 percent of theoretical yield. The resulting product had a purity of 94.2 percent as determined by the method referred to in Example 1.

In view of the very rapid oxidation process disclosed in the present invention which permits all reactants to thoroughly react while they are in solutions where they are easily subjected to thorough agitation it is obvious that the disclosed process lends itself readily to a continuous process for producing 2-(4-morpholinyldithio) benzothiazole.

While certain representative embodiments and details have been shown for the purpose of illustrating the invention it will be apparent to those skilled in this art that various changes and modifications may be made therein without departing from the spirit or scope of the invention.

What we claim is:

1. In the process of preparing 2-(4-morpholinylditho) benzothiazole which comprises preparing and heating a mixture of morpholine, sulfur, an inert organic solvent and a compound selected from the group consisting of 2-mercaptobenzothiazole and 2,2′ bis(benzothiazyl) disulfide to a temperature above the crystallization point of said mixture the improvement wherein at least a chemical equivalent of an aqueous solution of a water soluble oxidizing agent is rapidly added to said mixture prior to the crystallization of any of the 2-(4-morpholinyldithio) benzothiazole product.

2. In the process of preparing 2-(4-morpholinyldithio) benzothiazole which comprises preparing and heating a mixture which is composed of morpholine, sulfur, 2,2′ bis-(benzothiazyl) disulfide and an inert organic solvent to a temperature above the crystallization point of said mixture the improvement wherein at least a chemical equivalent of an aqueous solution of a water soluble oxidizing agent is rapidly added to said mixture prior to the crystallization of any of the 2-(4-morpholinyldithio) benzothiazole product.

3. In the process of producing 2-(4-morpholinyldithio) benzothiazole which comprises preparing and heating a mixture of morpholine, sulfur, 2,2′ bis(benzothiazyl) disulfide and isopropanol to a temperature above the crystallization point of said mixture the improvement wherein at least a chemical equivalent of the solution of sodium hypochlorite is rapidly added to said mixture prior to the crystallization of any of the 2-(4-morpholinyldithio) benzothiazole product.

4. In the process of preparing 2-(4-morpholinyldithio) benzothiazole which comprises preparing and heating a mixture of morpholine, sulfur, 2,2′ bis(benzothiazyl) disulfide and isopropanol to a temperature of 75° C. the improvement wherein at least a chemical equivalent of an aqueous solution of sodium hypochlorite is added to the reaction mixture within 30 seconds while the reaction mixture is being subjected to agitation.

5. In the process of preparing 2-(4-morpholinyldithio) benzothiazole which comprises preparing and heating a mixture of morpholine, sulfur, 2-mercaptobenzothiazole and an inert organic solvent to a temperature above the crystallization point of said mixture the improvement wherein at least a chemical equivalent of an aqueous solution of a water soluble oxidizing agent is rapidly added to said mixture prior to the crystallization of any of the 2-(4-morpholinyldithio) benzothiazole product.

References Cited by the Examiner

FOREIGN PATENTS 872,456 7/1961 Great Britain.

ALEX MAZEL, *Primary Examiner.*

HENRY R. JILES, *Examiner.*

J. TOVAR, *Assistant Examiner.*